(12) United States Patent
Yilmaz

(10) Patent No.: US 7,846,858 B2
(45) Date of Patent: Dec. 7, 2010

(54) GLAZE FOR ANNEALING SURFACES

(75) Inventor: Ismail Yilmaz, Aschaffenburg (DE)

(73) Assignee: Denseo GmbH, Aschaffenburg (DE)

( * ) Notice: Subject to any disclaimer, the term of this patent is extended or adjusted under 35 U.S.C. 154(b) by 323 days.

(21) Appl. No.: 12/208,722

(22) Filed: Sep. 11, 2008

(65) Prior Publication Data

US 2009/0074945 A1 Mar. 19, 2009

(30) Foreign Application Priority Data

Sep. 13, 2007 (DE) .................. 10 2007 044 845

(51) Int. Cl.
*C03C 8/08* (2006.01)
(52) U.S. Cl. .............. 501/24; 501/63; 501/64; 501/77; 501/78; 106/35
(58) Field of Classification Search .......... 501/24, 501/63, 64, 77, 78; 106/35
See application file for complete search history.

(56) References Cited

U.S. PATENT DOCUMENTS 5,618,763 A 4/1997 Frank et al.
6,620,747 B2 9/2003 Schweiger et al.
6,626,986 B2 9/2003 Schweiger et al.
7,341,964 B2 * 3/2008 Emlemdi .................. 501/26

FOREIGN PATENT DOCUMENTS

| EP | 1167311 A1 | 1/2002 |
| EP | 1170261 A1 | 1/2002 |
| EP | 0847375 B1 | 9/2002 |
| EP | 1329430 A2 | 7/2003 |
| JP | 2003026444 A | 1/2003 |
| WO | 2007014571 A1 | 2/2007 |

\* cited by examiner

*Primary Examiner*—Karl E Group
(74) *Attorney, Agent, or Firm*—The Webb Law Firm

(57) ABSTRACT

The invention concerns a glaze for annealing surfaces, particularly of ceramic parts used in the field of medicine, comprising the components 30 to 55% $SiO_2$, 0 to 7% $Al_2O_3$, 10 to 30% $R_2O$, 5 to 10% R'O, 0.5 to 15% $B_2O_3$, 5 to 10% $Bi_2O_3$, 1 to 10% $P_2O_5$, 0 to 5% $Sb_2O_3$, 0 to 5% $SnO_2$, 0 to 5% $TiO_2$ and 5 to 10% $ZrO_2$ by mass, wherein (R) is one or several alkali metals and (R') is one or several bivalent metals from the group comprising alkaline earth metals and zinc, and wherein the glaze is obtained by melting or sintering the components.

14 Claims, No Drawings

GLAZE FOR ANNEALING SURFACES

The invention concerns a glaze frit for annealing surfaces, particularly for annealing surfaces of ceramic components to be used in the medical field. The glaze is especially well-suited for the improvement of surfaces of parts of dental ceramics in the field of restorative dentistry.

The manufacture of dental prostheses, such as coronas and bridges as replacement for missing teeth, or as inlays as a replacement of the traditional, mercury-based fillings, is a field of steady technical advancement. For esthetical reasons as well as technical ones, metal prostheses are being replaced increasingly by prostheses on the basis of ceramics. Artificial teeth for bridges and coronas, for instance, can be made to look very similar to natural ones, if they are built up by firing of dental ceramic masses in multiple layers.

Ceramic material is not only preferred over metallic pieces because of its esthetic quality, but rather because of its greater hardness, similar to that of the natural tooth, and because of its durability and inertia against chemical reactions and its lack of electric conductivity.

Traditionally, ceramic dental prostheses are made by forming a mould off the residual dental structure in the mouth, and casting a base made of noble metals from this mold. On this base, ceramic masses are fired in multiple layers (metal ceramics). Alternatively, the manufacture of dental prostheses from ceramics without a metal base (whole ceramics) has advanced in recent years.

A disadvantage of the ceramic compounds of the state of the art is their lack of strength. This is often explained by the presence of microscopic fissures in the ceramic material. Such fissures have a size of two to six micrometers, and can not be observed within the ceramic material without visual aids. If the thermal expansion coefficients differ within the materials employed in a prosthesis, the fissures can expand and lead to the mechanical destabilization of the ceramic prosthesis. Such fissures can originate during the process of manufacture, or can occur as so-called late fissures.

The manufacture of artificial teeth with traditional ceramic masses can either be concluded by polishing the work piece to perfection, or by sealing the surface of the piece by covering with a glaze. Both processes are used.

Polishing can leave miniscule fissures on the surface, which favors the entry of chemical compounds into the ceramic prosthesis, leading to color changes or mechanical destabilization.

Glazes are easily applied, yet are controversial because of the leaching of compounds that may lead to hyperreactions, particularly in the case of patients prone to allergies. Furthermore, many glazes partially dissolve over time or are mechanically destroyed by chewing.

Most manufacturers of prostheses offer ceramic sheathing product lines that are adjusted within the line of products. Not every sheathing can be covered with any glazing mass. In most cases, the ceramic sheathing line and the glazing line are intimately dependent.

Artificial teeth are single copy pieces formed individually from molds taken off the patient's anatomy. The manufacture of such pieces is very labor intensive. If after firing, the manufactured piece does not show the desired color, in most cases it has to be discarded, as a later change of color cannot be attained. It would thus be desirable to provide processes that enable a post-firing change of color of dental ceramics.

In view of this state of the art, it is the objective of the present invention to provide a glaze and a process for applying such glaze, the glaze providing a good sealing of dental ceramic material, long-term mechanical and chemical stability, and an applicability to many different ceramic sheathings on artificial teeth.

This objective is attained by a glaze and a process according to the independent claims.

The glaze according to the invention comprises silicon oxide ($SiO_2$) of 30 to 55 percent (by mass). The inventive glaze comprises no or only minute amounts of lithium disilicate, in contrast to the glazes known from the state of the art.

The glaze according to the invention comprises phosphate, yielding a substance that approximates the qualities of the natural tooth and yet allows its application on different sheathing ceramic materials.

Furthermore, the glaze comprises a mass part of 5 to 10% zirconium dioxide ($ZrO_2$), which may comprise stabilizers such as, for example, $Y_2O_3$, $CeO_2$ and/or MgO. Zirconium dioxide is an ingredient providing advantageous mechanical properties.

Furthermore, the glaze comprises 10 to 30% alkaline metal oxides (oxides of the metallic elements of group 1 of the periodic table), such as potassium oxide, sodium oxide or lithium oxide.

Furthermore, the glaze comprises 5 to 10% alkaline earth metal oxides (oxides of the metallic elements of group 2 of the periodic table) or zinc oxide.

Furthermore, the glaze comprises 0.5 to 15% boron oxide, 5 to 10% bismuth oxide ($Bi_2O_3$), 1 to 10% phosphorus pentoxide ($P_2O_5$), up to 5% antimony oxide ($Sb_2O_3$), up to 5% tin oxide ($SnO_2$), up to 5% titanium oxide, and adjuvants such as, for example, pigments of modifiers.

According to one embodiment of the current invention, the glaze comprises $Y_2O_3$ and/or $CeO_2$, for example 1% by mass.

According to one embodiment of the current invention, the glaze comprises up to 7% aluminum oxide.

The inventive glaze has a low melting point and a lower solubility in acids than comparable glass ceramic materials of the state of the art.

According to one embodiment of the current invention, the coloring, fluorescence or opalescence of the ceramic can be modified by adding at least one pigment and/or an opalescence-aiding compound and/or a fluorescence modifying compound, preferably at a mass ratio of less than 5%.

In its finished state, that is, applied and fired, the glaze is in a glassy state. This lowers the solubility of hydroxyl apatite, which may be present in the glaze according to one aspect of the invention, in comparison to the natural dental material. A crystalline phase may be present in parallel, and may comprise hydroxyl apatite or other crystalline phases. The process of manufacture is of decisive importance for the presence and quality of any crystalline phase.

In contrast to the glazes known in the state of the art, the inventive glaze comprises no significant amounts of lithium disilicate. According to one aspect of the invention, the glaze can be pressed onto a sheathing.

The glaze comprises 5 to 10 mass percent of zirconium dioxide ($ZrO_2$). This compound raises the surface stability of the finished glaze. Zirconium is of special importance for materials forming the base of dental prostheses because of its mechanical qualities. Zirconium dioxide, however, raises the melting temperature of the glaze. According to one aspect of the invention, the inventive glaze can be fired at temperatures below 850 degrees Celsius, assuring a broad applicability of the glaze. This is surprisingly provided by the composition of the glaze in spite of its zirconium content.

According to one embodiment of the current invention, the firing temperature is 750 to 850 degrees Celsius, most preferred approximately 800 degrees Celsius.

According to one embodiment of the current invention, the components of the glaze are of high purity, such as quartz or rutil. It is preferred to use quartz of >99% $SiO_2$ purity, at a granularity of below 100 micron. Other minerals such as feldspar may be used, also at preferred puritities of above >90% and granularities of below 100 micron.

The compounds are easily processed if used as a powder or paste.

The glaze according to the invention is compatible to many dental ceramic masses, in contrast to glazes of the state of the art, and can be applied to a broad range of artificial teeth of ceramic material. The glaze according to the invention is not restricted to silicon disilicate bases. According to one aspect of the invention the glaze is applied as a last layer onto sheathings in order to attain their similarity to natural dental enamel.

According to one embodiment of the current invention, the glaze according to the invention can be applied directly to the dental base material, if this is required for medical or technical reasons. The dental base material can be a metal alloy or a substrate made of glass or ceramic.

The properties of the glaze according to the invention allow the glaze to be applied to a wide range of materials, particularly metal ceramic and whole ceramic materials with different thermal expansion coefficients and firing temperatures.

MOST PREFERRED EMBODIMENT

According to a preferred embodiment of the current invention, a glaze for annealing surfaces has the following composition:

| | |
|---|---|
| $SiO_2$ | 30-55%, preferred 40-55% |
| $Al_2O_3$ | 0-7%, preferred 3-7% |
| $R_2O$ | 10-30%, preferred 20-30% |
| e.g. $K_2O$ | 5-8% |
| $Na_2O$ | 5-10% |
| $Li_2O$ | 0-5% |
| R'O | 5-10% |
| e.g. CaO | 5-10%, |
| MgO | 0-5% |
| ZnO | 0-5% |
| $B_2O_3$ | 0.5-15% |
| $Bi_2O_3$ | 5-10% |
| $P_2O_5$ | 1-10% |
| $Sb_2O_3$ | 0-5% |
| $SnO_2$ | 0-5% |
| $TiO_2$ | 0-5% |
| $ZrO_2$ | 5-10% |

All percentages are to be understood as mass percent, in relation to the mass of the glaze.

The glaze according to the invention is compatible to many ceramic materials for dental prostheses, in contrast to the glazes known in the state of the art. The glaze according to the invention can be applied to many different artificial teeth made from ceramics. Lithium disilicate bases are not required.

According to one aspect of the invention, the glaze is not applied to substrates directly, but as a last layer onto sheathings in order to attain a similarity of such sheathings to natural dental enamel.

According to another aspect of the invention, the glaze can be applied as a last layer directly to the dental base material, if this is required for medical or technical reasons.

The glaze according to the invention can be applied to metal ceramic and whole ceramic dental prostheses with different thermal expansion coefficients and firing temperatures.

What is claimed is:

1. A glaze for annealing surfaces, comprising the following components by mass:
   30 to 55% $SiO_2$,
   0 to 7% $Al_2O_3$,
   10 to 30% $R_2O$,
   5 to 10% R'O,
   0.5 to 15% $B_2O_3$,
   5 to 10% $Bi_2O_3$,
   1 to 10% $P_2O_5$,
   0 to 5% $Sb_2O_3$,
   0 to 5% $SnO_2$,
   0 to 5% $TiO_2$ and
   5 to 10% $ZrO_2$,
   wherein (R) is one or several alkali metals and (R') is one or several bivalent metals from the group comprising alkaline earth metals and zinc, and wherein the glaze is obtained by melting or sintering the components.

2. The glaze according to claim 1, wherein the the alkali metal oxides $R_2O$ comprise 5 to 8% $K_2O$, 5 to 10% $Na_2O$, and/or 0 to 5% $Li_2O$ by mass, as percent of the total mass of the glaze.

3. The glaze according to claim 1, wherein the bivalent metal oxides R'O comprises 5 to 10% CaO, 0 to 5% MgO and/or 0 to 5% ZnO by mass, as percent of the total mass of the glaze.

4. The glaze according to claim 1, wherein the
   $SiO_2$ is 40 to 55%,
   $Al_2O_3$ is 3 to 7%,
   $R_2O$ is 20 to 30%, and
   CaO is 5 to 10%
   by mass, as percent of the total mass of the glaze.

5. The glaze according to claim 1, wherein $Y_2O_3$ and/or $CeO_2$ are comprised in the glaze.

6. The glaze according to claim 1, wherein least one pigment and/or a compound contributing opalescence or fluorescence is added to the glaze.

7. A process for the manufacture of a glaze for annealing surfaces, whereby the components
   30 to 55% $SiO_2$,
   0 to 7% $Al_2O_3$,
   10 to 30% $R_2O$,
   5 to 10% R'O,
   0.5 to 15% $B_2O_3$,
   5 to 10% $Bi_2O_3$,
   1 to 10% $P_2O_5$,
   0 to 5% $Sb_2O_3$,
   0 to 5% $SnO_2$,
   0 to 5% $TiO_2$ and
   5 to 10% $ZrO_2$,
   wherein (R) is one or several alkali metals and (R') is one or several bivalent metals from the group comprising alkaline earth metals and zinc,
   are mixed in finely grained form as a powder or paste, and are applied to a surface destined to be annealed,
   the powder or paste are heated to a firing temperature, so that a reaction yielding a reaction product occurs between the components, resulting in the reaction product being irremovably applied to the surface destined to be annealed, and
   the glaze is obtained by allowing the components to cool.

8. The process according to claim 7, wherein the the alkali metal oxides $R_2O$ comprise 5 to 8% $K_2O$, 5 to 10% $Na_2O$, and/or 0 to 5% $Li_2O$ by mass, as percent of the total mass of the glaze.

9. The process according to claim 7, wherein the bivalent metal oxides R'O comprises 5 to 10% CaO, 0 to 5% MgO and/or 0 to 5% ZnO by mass, as percent of the total mass of the glaze.

10. The process according to claim 7, wherein the
$SiO_2$ is 40 to 55%,
$Al_2O_3$ is 3 to 7%,
$R_2O$ is 20 to 30%, and
CaO is 5 to 10%
by mass, as percent of the total mass of the glaze.

11. The process according to claim 7, wherein $Y_2O_3$ and/or $CeO_2$ are comprised in the glaze.

12. The process according to claim 7, wherein the purity of the $SiO_2$ is at least 99%.

13. The process according to claim 7, wherein the firing temperature is 650 to 900° C.

14. The process according to claim 7, wherein the firing temperature is 750 to 850° C.

* * * * *

UNITED STATES PATENT AND TRADEMARK OFFICE
CERTIFICATE OF CORRECTION

PATENT NO. : 7,846,858 B2
APPLICATION NO. : 12/208722
DATED : December 7, 2010
INVENTOR(S) : Yilmaz It is certified that error appears in the above-identified patent and that said Letters Patent is hereby corrected as shown below:

Column 4, Line 19, Claim 2, "wherein the the alkali" should read -- wherein the alkali --

Column 4, Line 64, Claim 8, "wherein the the alkali" should read -- wherein the alkali --

Signed and Sealed this
Twelfth Day of April, 2011

David J. Kappos
*Director of the United States Patent and Trademark Office*